United States Patent [19]

Brummelhuis

[11] Patent Number: 5,131,321

[45] Date of Patent: Jul. 21, 1992

[54] VESSEL FOR TREATING A FINELY-DIVIDED MATERIAL WITH A FLUID

[75] Inventor: Johannes A. J. Brummelhuis, Nieuwkoop, Netherlands

[73] Assignee: Stork LPI B.V., Netherlands

[21] Appl. No.: 639,047

[22] Filed: Jan. 9, 1991

[30] Foreign Application Priority Data

Jan. 11, 1990 [NL] Netherlands ............... 9000081

[51] Int. Cl.⁵ .................. B01D 11/02; A23N 12/00
[52] U.S. Cl. ........................ 99/471; 99/404; 99/516; 99/534; 134/182; 210/205; 210/220
[58] Field of Search ............... 99/516, 534, 536, 494, 99/403, 404, 407, 408, 410, 417, 485; 134/182, 183, 102; 68/181 R; 210/188, 205, 220, 221.1, 221.2; 209/165, 170; 261/123

[56] References Cited

U.S. PATENT DOCUMENTS

| | | | |
|---|---|---|---|
| 1,047,534 | 12/1912 | Joseph | 210/220 |
| 2,413,838 | 1/1947 | Mallory | 210/221.1 |
| 2,783,884 | 3/1957 | Schaub | 209/165 |
| 3,243,318 | 3/1966 | Mihara et al. | 134/182 |
| 3,730,809 | 5/1973 | Dietch | 134/182 |
| 3,772,193 | 11/1973 | Nelli et al. | 210/205 |
| 4,274,960 | 6/1981 | Abrahamsson | 210/221.1 |
| 4,498,985 | 2/1985 | Atkinson et al. | 210/205 |
| 4,543,878 | 10/1985 | Luchetti | 99/407 |
| 4,817,518 | 4/1989 | Wyatt et al. | 99/516 |
| 4,957,043 | 9/1990 | Silvestrini et al. | 99/471 |
| 4,962,699 | 10/1990 | Karlsson et al. | 99/494 |

FOREIGN PATENT DOCUMENTS

| | | |
|---|---|---|
| 344314 | 11/1921 | Fed. Rep. of Germany . |
| 2218296 | 4/1972 | Fed. Rep. of Germany . |
| 2284845 | 9/1975 | France . |
| 27228 | 9/1902 | Switzerland ............ 210/221 R |
| 1024824 | 4/1966 | United Kingdom . |

Primary Examiner—Timothy F. Simone
Attorney, Agent, or Firm—Brooks & Kushman

[57] ABSTRACT

A vessel for treating a finely-divided material, such as granules, powder, flakes and the like with a fluid, comprising an essentially closed wall having product feed and discharge means for feeding finely-divided material to and discharging it from the vessel, and also fluid feed and discharge means for feeding fluid to and discharging it from the vessel, one of the fluid feed and discharge means in each case opening into the bottom region of the vessel and the other into the top region, wherein between the fluid feed and discharge means sieve means are provided for preventing entrainment of finely-divided material. According to the invention, the sieve means are formed by a perforated basket which at a certain height of the vessel is in contact with the entire internal periphery of the outside wall, so that the vessel is divided into a separate top and bottom region between the vessel and the basket, said product feed and discharge means being connected to the interior of said basket, and the fluid feed and discharge means each opening in either the top or bottom region of the vessel. Further said vessel can be designed as a sluice for interconnecting two containers of differing internal pressure.

11 Claims, 2 Drawing Sheets

VESSEL FOR TREATING A FINELY-DIVIDED MATERIAL WITH A FLUID

BACKGROUND OF THE INVENTION

The present invention relates to a vessel according to the pre-characterizing part of claim 1.

Such a vessel is generally known and is used, inter alia, for the treatment of food products such as, for example: wheat, rice, herbs, nuts, coffee etc. For example, grain is steam-treated in order to soften it, so that it can be used as the unground kernel in the production of wholemeal bread. Or, for example, for the treatment of coffee with supercritical carbon dioxide in order to make it low in caffeine.

GB-A-1 024 824 discloses a vessel according to the pre-characterizing part of claim 1 in which the sieve means comprise strainers to prevent entrainment of granular material by the fluid out of the vessel.

The above vessel however presents a number of disadvantages. Said strainers possess a relatively small surface area, which will undoubtfully give rise to some blocking of the fluid discharge means. A granular material being treated with a liquid will always become more or less tacky and will stick to any surface encountered. Further no sieve means are provided between the fluid feed means and product discharge means.

SUMMARY OF THE INVENTION

The object of the invention is to overcome the above-mentioned disadvantages of the known vessel and to provide a generally improved vessel for treating a finely-divided material with a fluid. This object is attained by a vessel having the features of the characterizing part of claim 1.

The vessel according to the present invention has the advantage that it is not only possible to prevent granular material being carried along with the fluid, with the result that, after treatment of the finely-divided material with the fluid, the fluid additionally has to have the finely-divided material carried along removed from it, but in addition, the vessel according to the invention has a large discharge surface on the basket, so that the discharge of, for example, fluid after a quantity of a finely-divided material has been treated with it does not constitute any problem at all. The vessel according to the present invention can also be used for a large number of applications such as, for example, sterilizing, in other words, maintaining the product at a specific high temperature for a certain period of time, or popping, in other words, bringing the product to a high temperature for a short period of time by means of, for example, steam, so that the product absorbs moisture and/or reaches a certain temperature, following which the pressure rapidly is released. In the case of maize the formation of a light product occurs through the so-called flash effects of moisture in the product. The vessel according to the present invention is, of course, also suitable for the treatment of finely-divided material under pressure, and also for the extraction of finely-divided material with the aid of a fluid, such as, for example, the extraction of oil from nuts using a solvent, or caffeine from coffee beans. The feed and discharge means for the finely-divided material in the vessel according to the present invention are not separated from the feed and discharge means for the fluid by small strainers, but the above-mentioned perforated basket with a relatively large surface area is situated between them.

The basket is advantageously made of two tapering perforated parts which are fixed to each other by the broadest side, the dimensions of this broadest side corresponding to the internal dimensions of the wall of the vessel, and the basket being fixed to the inside of the wall of the vessel at the position of this broadest part.

It is possible in this way for the fluid entering from the top side or the bottom side of the vessel to enter through a large surface in the top or bottom side of the basket and to leave it at the other side, so that good contact of the fluid with the finely-divided material is ensured. Through this arrangement, two spaces separated from each other are formed in the upper and lower region of the vessel, which spaces are bounded by the wall of the basket and the wall of the vessel in the upper and lower side thereof respectively, the fluid feed means opening into the one space, and the fluid discharge means opening into the other space.

The basket is advantageously made of metal gauze, perforated sheet metal or expanded metal. These materials can be obtained in all kinds of dimensions and meshes, with the result that the field of application of the vessel according to the invention is extremely wide, in other words, both granular and powdered material can be treated, and one is thus not restricted by the size of the particles. A metal basket is also very strong and corrosion-resistant and will generally not have any adverse effect on, for example, the foods to be treated.

The fluid feed and discharge means are advantageously made in the form of a feed and discharge channel, and the product feed and discharge means are in the form of channels which are connected to the top and bottom side of the vessel respectively, and which can be shut off by a valve, preferably a conical feed and discharge valve, the apex of which faces the feed and discharge direction of the product respectively. The conical shape of said valves simplifies the opening and closing thereof and minimizes damage to the finely-divided material.

The basket is very advantageously fitted slightly movable in the vessel. When a finely-divided material is being treated with, for example steam, the result of this can be that the material becomes slightly sticky, so that it can stick to the inside of the basket. As a result of the moveability of the basket, the adhering finely-divided material can be shaken off the wall of the basket by intermittent introduction of the fluid.

In a special embodiment of the vessel, the fluid feed means are fitted in the discharge valve for the finely-divided material.

The fluid feed and discharge means are generally made in the form of feed and discharge channels respectively, but it is also advantageous if they are in the form of channels distributed along the periphery of the vessel and opening out into the upper and lower region of the vessel. This is particularly advantageous for the fluid feed side of the vessel, since the entire periphery of the basket, which is filled with finely-divided material, can then be brought into contact with clean, unused fluid, which results in a homogeneous throughflow.

It is particularly advantageous for the vessel to be designed as a sluice for interconnecting two containers of differing internal pressure, and for the fluid feed and discharge means to be designed for adaptation of the pressure in the vessel to the pressure in the container to which the vessel has to be connected with the interposition of the appropriate valve.

The vessel according to the invention is very suitable for use as a sluice. It can be used either as a sluice between two containers of differing pressure, in the case of which material has to be conveyed out of a high-pressure container into a low-pressure container, or vice versa. This has the advantage that the container in which the processing with the material takes place can in fact operate continuously, without the necessity of reducing or increasing the pressure in it. The advantages of the vessel, such as the possibility of shaking the basket, are also extremely useful when it is being used as a sluice.

The invention also relates to a device which is provided with one or more vessels according to the invention.

DESCRIPTION OF THE PREFERRED EMBODIMENTS

Figure 1:
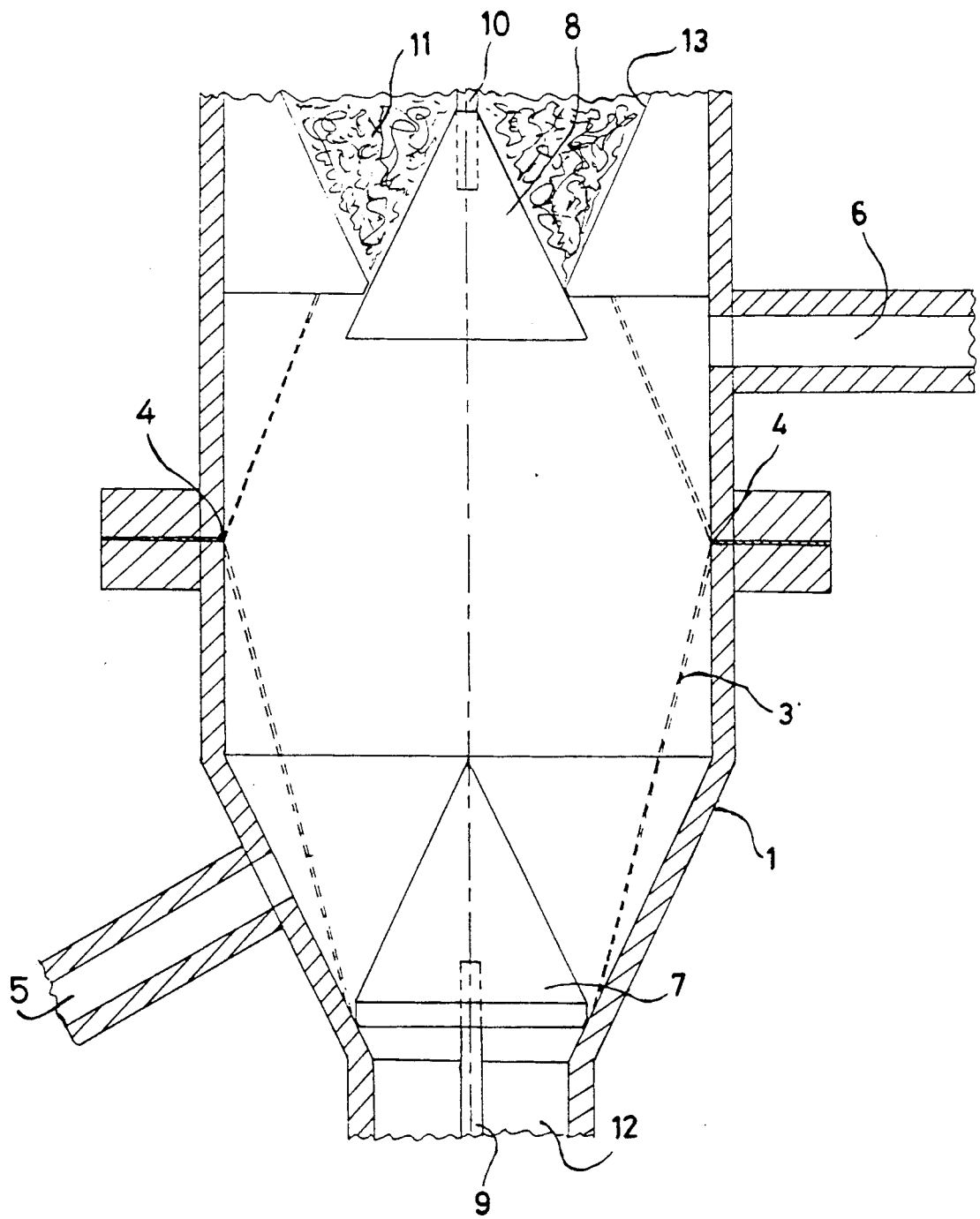
FIG. 1 shows a vessel according to the present invention.

FIG. 1 shows an example of a vessel according to the present invention, indicated by reference number 1, containing a basket 3, which at 4 is fixed to the entire internal periphery of the wall of the vessel. Reference numbers 5 and 6 are fluid feed and discharge means, and 7 and 8 are conical product feed and discharge means.

In operation, valve 8 is moved by rod 10 in the direction of valve 7, as a result of which finely-divided material 11 is charged from a feed hopper 13 or the like into the basket 3. Valve 8 is then closed, following which, for example, through channel 5 a gas is fed in, which gas leaves the vessel through discharge channel 6 after having flowed through the basket. It will be clear that if a liquid is used as the fluid, channel 6 will preferably serve as the feed channel and channel 5 as the discharge channel. The vessel can also be placed under pressure by, for example, closing channel 6 and feeding a gas through channel 5. The temperature in the vessel can also be regulated through the use of steam. After treatment of the finely-divided material 11 in the basket 3 with the fluid, valve 7 is moved by rod 9 in the direction of valve 8, causing valve 7 to be opened and the finely-divided material 11 to leave the basket 3 through discharge channel 12.

After this, the reactor is ready for a subsequent operation.

The fluid used can be circulated if necessary, in order to obtain as good a treatment of the finely-divided material as possible with a limited quantity thereof.

If the basket 3 is fitted in the vessel in a slightly movable manner, for example if the basket 3 is made of expanded metal, on the occurrence of stickiness of the finely-divided material, which consequently adheres to the inside wall of the basket 3, said material can be shaken off the inside wall of the basket 3 by feeding in a gas or liquid intermittently through one of the channels 5 or 6.

In FIG. 1 only one feed and discharge channel (5, 6) is shown, while it is preferably to fit several of such channels in a circle around the vessel. This means that at the top side of the vessel several channels 6 are provided in a circle around the vessel, and several channels 5 are fitted distributed in a circle at the bottom side of the vessel. Such a design has the advantage that a very uniform and homogeneous fluid feed and discharge are ensured. This means that when, for example, one feed channel is being used, the material closest to said channel is prevented from being treated the most intensively with the fluid, which would be a disadvantage for the homogeneity of the finally treated product.

The use of conical valves 7, 8 for the product feed and discharge has the advantage that on opening and closing relatively little finely-divided material can be damaged, and the force needed for opening and closing is relatively small.

Figure 2:
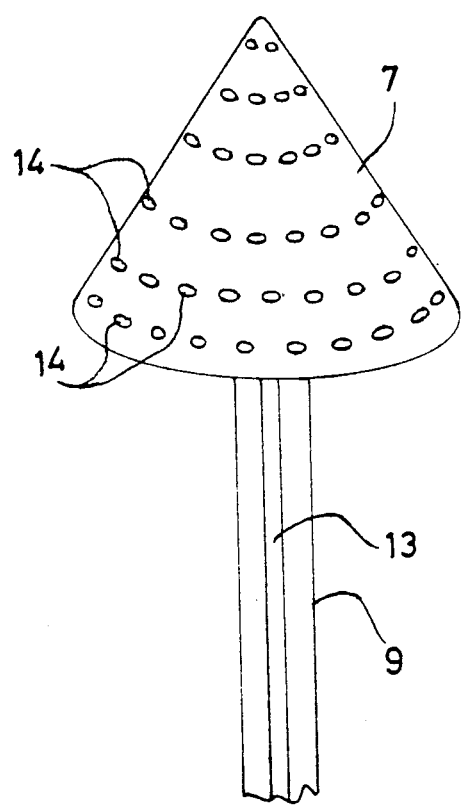
FIG. 2 shows a conical product discharge valve which is provided with fluid feed channels.

FIG. 2 shows a special embodiment of the product discharge valve 7. In this case the rod 9 contains a fluid feed channel 13 which opens out into apertures 14 in the surface of the conical valve 7, and thus directly into the basket 3. This is particularly advantageous if a powdered or finely-divided material has to be treated with a stream of gas, since a fluidized bed can be produced in this way.

The vessel according to the invention is very well suited to all earlier described applications and does not have the disadvantages of the vessel according to the state of the art.

What is claimed is:

1. A vessel for treating a finely divided material, such as granules, powder or flakes, with a fluid, the vessel comprising:
    an essentially closed chamber having a peripheral wall with material feed and discharge means at opposite ends for feeding finally divided material to and discharging it from the vessel;
    a closed material-receiving basket in the chamber having perforated walls extending between opposite ends of the chamber and surrounding said material feed and discharge means, said perforated walls contacting the chamber wall peripherally continuously therearound at a location intermediate opposite ends of the chamber and being elsewhere spaced from the chamber wall to define separate fluid feed and discharge regions at opposite sides of said location and extending therefrom to opposite ends of the chamber between the perforated basket walls and the chamber wall; and
    fluid feed and discharge means communicating with said fluid feed and discharge regions;
    whereby said perforated basket will allow treatment of finely divided materials by fluid admitted to the chamber and will prevent entrainment of such materials in fluid being discharged from the chamber.

2. The vessel according to claim 1, wherein the basket is made of two tapering perforated parts, each part having a narrow and a broad end, the broad ends being fixed to each other and configured in shape to correspond to and being affixed to the internal periphery of the chamber.

3. The vessel according to claim 1, wherein the basket is made of metal gauze, perforated sheet metal or expanded metal.

4. The vessel according to claim 1, wherein the fluid feed and discharge means are made in the form of feed and discharge conduit, respectively.

5. The vessel according to claim 1, wherein the material feed and discharge means are in the form of conduits which are connected to the opposite ends of the vessel, respectively; and valve means for controlling the flow of material through the conduits.

6. The vessel according to claim 5, wherein the feed and discharge valves are conical feed and discharge valves respectively whose apexes are disposed facing in the opposite direction to the feed and discharge direction respectively of the product.

7. The vessel according to claim 1, wherein the basket is movably mounted relative to the chamber of the vessel so that the basket may be shaken.

8. The vessel according to claim 1, wherein the fluid feed and/or discharge means are in the form of conduits distributed along the periphery of the vessel and opening into the lower and/or upper regions of the vessel.

9. The vessel according to claim 1 wherein the material feed and discharge means are adapted to fluidly connect between storage containers of differing internal pressure, the storage containers storing the finely divided material, whereby the vessel serves as a sluice controlling the flow of material between the storage containers.

10. A vessel for treating a finely-divided material, such as granules, powder or flakes, with a fluid, the vessel comprising:
   an essentially closed chamber having vertically spaced product feed and discharge means for feeding finely-divided material to and discharging it from the vessel, said material feed and discharge means having feed and discharge valves, respectively, to control the flow of material therethrough;
   a closed perforated basket in the chamber for receiving the finely-divided material and surrounding the material feed and discharge means, said basket extending between opposite ends of the chamber and continuously peripherally contacting the chamber at a location intermediate the product feed and discharge means thereby defining top and bottom feed and discharge regions spaced between the basket and the chamber at opposite sides of said location and extending therefrom to the opposite ends of the chamber; and
   fluid discharge means communicating with either of the top or bottom feed and discharge regions and fluid feed means located in the material discharge means;
   whereby said perforated basket will allow treatment of finely divided materials by fluid admitted to the chamber and will prevent entrainment of such materials in fluid being discharged from the chamber.

11. The vessel of claim 10 wherein the feed and discharge valves are conical feed and discharge valves, respectively, whose apexes are disposed facing in the opposite direction to the feed and discharge direction, respectively, of the material.

* * * * *